(12) United States Patent
Hellum

(10) Patent No.: US 6,438,698 B1
(45) Date of Patent: Aug. 20, 2002

(54) REDUCTION OF ELECTROMAGNETIC EMISSION

(75) Inventor: Pål Longva Hellum, Sandvika (NO)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/331,340

(22) PCT Filed: Sep. 16, 1997

(86) PCT No.: PCT/NO97/00247

§ 371 (c)(1),
(2), (4) Date: Aug. 13, 1999

(87) PCT Pub. No.: WO98/27481

PCT Pub. Date: Jun. 25, 1998

(30) Foreign Application Priority Data

Dec. 19, 1996 (NO) .............................................. 965471

(51) Int. Cl.$^7$ ................................................ G06F 1/26
(52) U.S. Cl. ....................................... 713/322; 713/601
(58) Field of Search ................................ 713/300, 320, 713/322, 500, 502, 600, 601

(56) References Cited

U.S. PATENT DOCUMENTS

| 5,297,275 A | | 3/1994 | Thayer |
| 5,481,697 A | | 1/1996 | Mathews et al. |
| 5,632,040 A | * | 5/1997 | Nakajima .................... 713/321 |
| 6,327,661 B1 | * | 12/2001 | Kocher et al. ................ 380/28 |

FOREIGN PATENT DOCUMENTS

| GB | 2246455 A | 1/1992 |
| GB | 2301202 A | 11/1996 |

* cited by examiner

Primary Examiner—Glenn A. Auve
(74) Attorney, Agent, or Firm—Jenkens & Gilchrist, P.C.

(57) ABSTRACT

The present invention relates to a method for reducing electromagneic emission, especially in connection with high-performance real-time systems, and more specifically for complying with the EMC (ElectroMagnetic Compatibility) thereof, and in order to acheive a reduced electromagnetic emission, it is according to the invention suggested to control the access to the CPU (Central Processing Unit) bus for thereby through power-down to reduce said bus-activity and thereby reduce the electromagnetic emission therefrom.

9 Claims, 3 Drawing Sheets

REDUCTION OF ELECTROMAGNETIC EMISSION

FIELD OF THE INVENTION

The present invention relates to reduction of electromagnetic emission, and more specifically to a method for reducing electromagnetic emission, especially in connection with high-performance real-time systems, and for complying with the EMC (ElectroMagnetic Compability) requirements thereof.

HISTORY OF THE RELATED ART

From U.S. Pat. No. 5,297,275 (Thayer) there is known a personal computer system comprising variable resolution timers, in which said variable resolution timers are set for the occurrence of the next timer tick interrupt. This arrangement prevents the central processing unit from being loaded unnecessarily with such interrupts, and thereby release processor capacity for other tasks. According to this publication it is also disclosed how the use of dynamic timer ticks can result in the receipt of timer tick interrupts in the central processing unit only at points in time at which this will result in the central processing unit performing a task.

However, from said U.S. publication Pat. No. 5,297,275 there is no reference to using dynamic timer tick interrupts in combination with power-down in order to reduce electromagnetic emission from the CPU in question.

From U.S. Pat. No. 5,481,697 (Mathews et al.) there is known an apparatus for providing a clock signal for a microprocessor at a selectable one of a plurality of frequencies and for dynamically switching between any of said plurality of frequencies. In other words, it is according to this publication suggested to use a variation of the clock frequency in order to adapt the processor speed to what is necessary for performing the task ready to be performed at any time in question. During periods where no task is to be performed there is used a power-down module for further reduction of the power consumption. During these periods this publication suggests timer tick interrupts having a time interval which is specific for the system.

From GB 2 246 455 (Bigwood/Philips) there is known a system in which the rate at which digital circuitry operates, is altered. However, neither this publication nor the previously discussed U.S. Pat. No. 5,431,697 disclose dynamic timer tick interrupts in combination with power-down for reducing electromagnetic emission from the CPU in question.

SUMMARY OF THE INVENTION

An object of the present invention is to provide a high-performance real-time system while still complying with EMC requirements.

Another object of the present invention is to provide a method for reducing electromagnetic emission wherein the solution is not handled as a separate hardware issue, thereby avoiding extra cost and possibly extra power consumption.

Still another object of the present invention is to provide a method for reducing electromagnetic emission while at the same time ordering the hardware timer ticks in a more appropriate and versatile manner.

Yet another object of the present invention is to provide a method for reducing electromagnetic emission wherein the CPU in question is awakened only upon applications/tasks requiring full operation of the CPU.

Another object of the present invention is to provide a method for reducing electromagnetic emission in a CPU system wherein only a minimum number of timer ticks are used in between full operation, for example in order to control an expected normal operation of said CPU.

A further object of the present invention is to provide a method for reducing electromagnetic emission in a system while giving improved accuracy of timers, i.e. providing a system wherein the hardware clock and the software timer are more closely tied together to render a higher timer resolution.

Still another object of the present invention is to provide a method for reducing electromagnetic emission in a system wherein the comparator controlling the connection between software and hardware timer ticks, is adapted to megahertz (MHz) clock pulses of the hard-ware clock.

Another object of the present invention is to provide a method for reducing electromagnetic emission in a system wherein the comparator and the software timers are updated according to the expected application or timer handling routine.

Still another object of the present invention is to provide a method for reducing electromagnetic emission, especially in a system wherein high frequency polling is avoided and wherein the protocol-handling is optimized in the most appropriate manner.

The above objects are achieved in a method as stated in the preamble, which according to the present invention is characterized by controlling the access to the CPU bus through CPU powerdown to reduce bus-activity and thereby reduce the electromagnetic emission therefrom.

In an appropriate embodiment this control of the access to the CPU bus may include the reduction of the bus access frequency, thereby reducing the corresponding number of interrupts handled by an interrupt service routine (ISR) and the corresponding number of checks performed by an operation system (OS) scheduler, and consequently increasing the CPU idle time.

Further advantages and features of the present invention will appear from the following description taken in connection with the appended drawings, as well as from the attached patent claims.

DETAILED DESCRIPTION OF EXEMPLARY EMBODIMENTS

Figure 1:
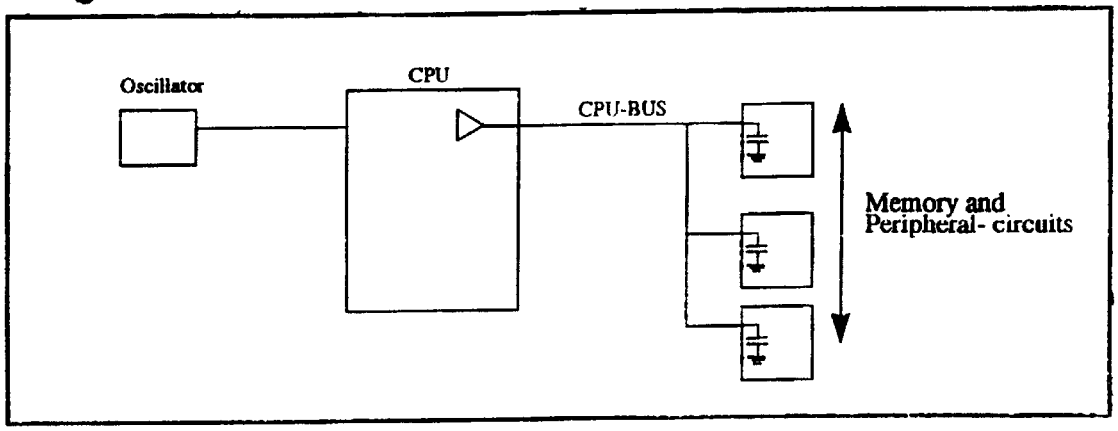
FIG. 1 is a schematical block diagram illustrating a simplified CPU system and driver stage.
Figure 2:
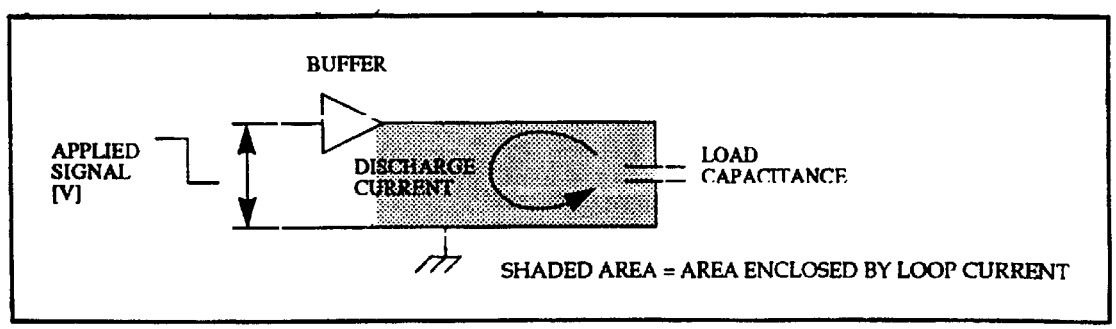
FIG. 2 is a simplified diagram for a driver stage with a negative edge signal.
Figure 3:
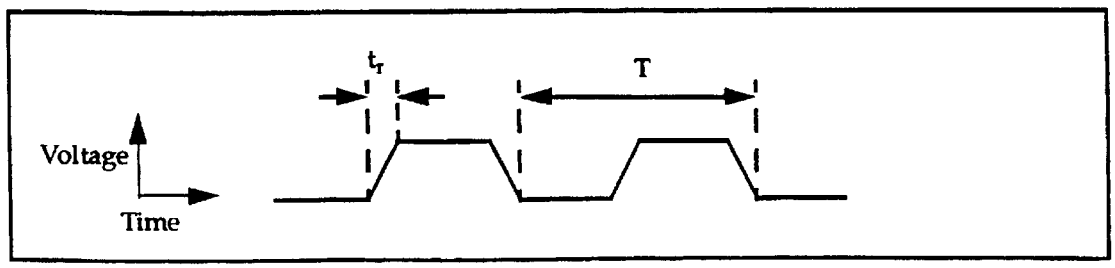
FIG. 3 illustrates a typical signal.

For the sake of giving a short summary of the mechanisms behind the emission of differential mode radiation from a signal line, reference should be made to FIGS. 1, 2 and 3, wherein FIG. 1 is a schematical block diagram illustrating a simplified CPU system and driver stage, FIG. 2 is a simplified diagram for a driver stage with a negative edge signal, and FIG. 3 illustrates a typical signal.

It is to be understood that the emitted radiation from a signal line is proportional to the fundamental frequency of the signal driving that line.

With specific reference to FIG. 1 it should be noted that each of the drivers on the CPU bus will carry currents to charge and discharge the capacitive load on the bus. In FIG. 2 there is illustrated one driver stage and the current that flows as the capacitor in the illustrated case is discharged.

The signal which is applied to the signal line will have a set of frequency components according to the signal characteristics. A typical signal is illustrated in FIG. 3, and the current resulting from this signal can be decomposed into the frequency components according to the fourier series as follows:

$$I_n = 2 \times I \times d \times (\sin(n\pi d)/n\pi d) \times \sin(n\pi t_r/T)/n\pi t/T$$

where

I=Driver short circuit current amplitude d=Duty cycle $t_r$=Rise time

T=Periodic time n=Harmonic number

If one assumes that d=0, 5 (50% duty cycle), that rise time is equal to fall time, and that the rise time is much less than the period (T), then the first harmonic has an amplitude of 0.64 I and only odd harmonics are present.

It should further be mentioned that one of the main international standards for electromagnetic emission is CISPR 22, this standard dealing with radiated and conducted emission.

Said standard CISPR 22 specifies measurements for emission through the use of receivers with so-called quasi-peak detectors.

Figure 4:
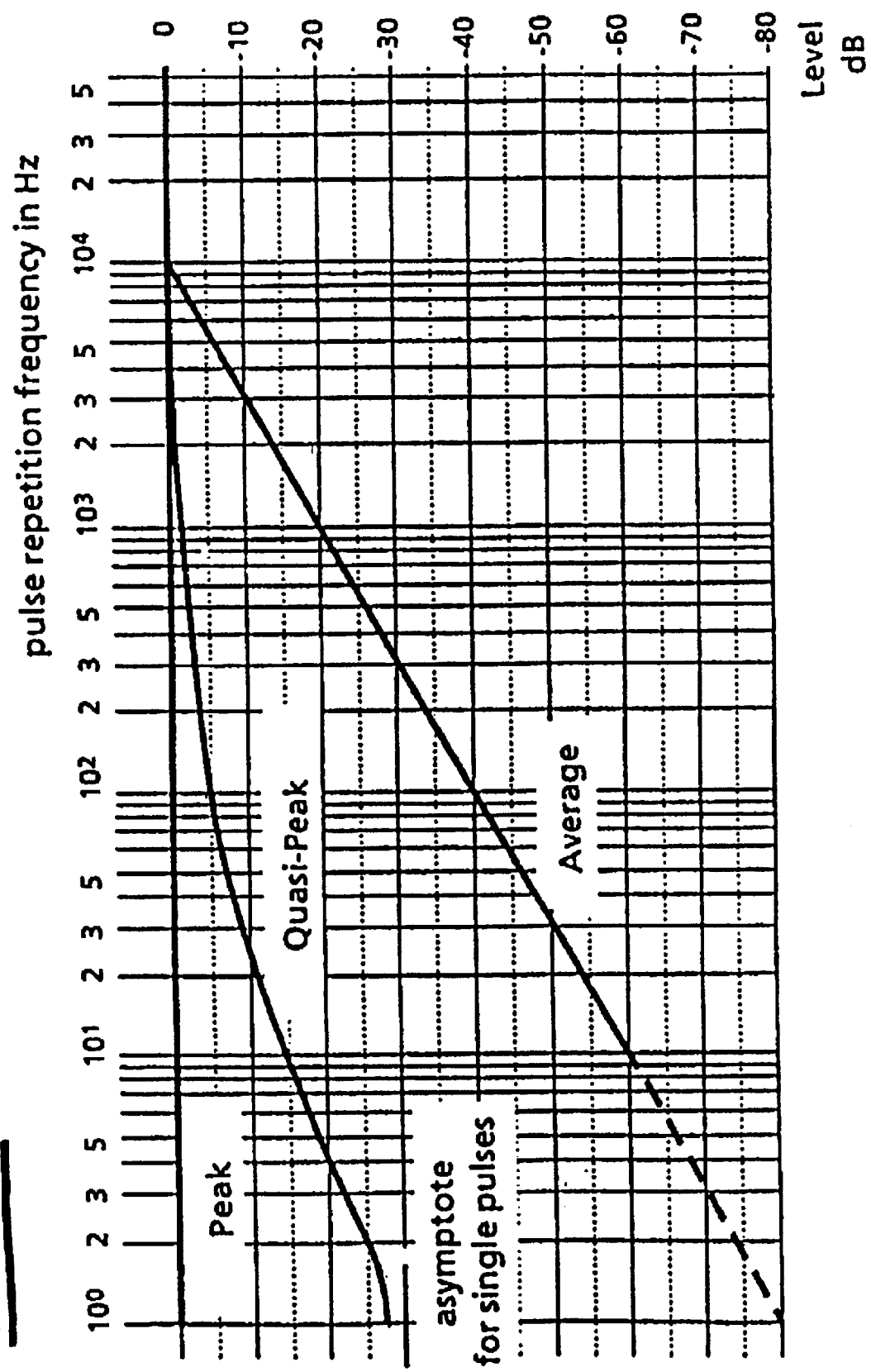
FIG. 4 is a diagram illustrating a comparison of peak, quasi-peak and average measurement (ref. Rohde & Schwarz).

FIG. 4 shows a comparison between peak, quasi-peak and average measurements, and as can be seen from this Figure the quasi-peak measurement is a downscaled version of the measured peak emission. The downscaling is dependent on the repetition frequency of the emitted noise, i.e. a kind of averaging.

This means that an emitted frequency that is repeated at intervals of less than 1 Hz, is downscaled by approximately 30 dB, and for repetition frequencies above 10 kHz there is no downscaling.

This means that if the CPU access to the bus can be controlled, then the repetition frequency seen by the quasi-peak receiver will change, and the measured radiation will be downscaled according to FIG. 4.

In the following there will be given a brief disclosure of what is meant by "CPU power-down" and "dynamic CPU operating frequency".

CPU Power-down

The CPU (Central Processing Unit) is powered down whenever the OS (Operating System) has no tasks to execute.

The CPU must be capable of entering a power-down mode. The wake-up of the CPU must be initiated by interrupts and must be quick enough for the required response time.

This is easy to add to almost any system. If the system is based on a commercial OS then at the lowest priority a task should be run that enters power-down mode. Any interrupt will then assure that the execution of the task continues. It is to be remembered that the timer is also interrupt driven, and this means that any polling at timer controlled intervals will run without problems.

The only situation that will run into problems is if a continuous polling of some kind is done. Therefore, this should be avoided. Generally, all EMC and power-reduction techniques are best implemented in a completely interrupt driven system.

The results will depend on the timer interval as, generally speaking, the timer will be the dominating interrupt source. A 5 msec timer should give a 3 dB reduction in the Q-Peak measurement compared to the original product (see FIG. 4 with 200 Hz repetition frequency).

The problem with this solution is that it is difficult to reduce the EMI (ElectroMagnetic interference) further as this will give too coarse timer resolution.

Dynamic CPU Operating Frequency

In some of the newer CPUs the operating frequency may be controlled through software. This feature may be exploited to tailor the CPU power to the instantaneous requirement. This means that the CPU may run at the speed which is necessary at the moment and not continuously at maximum speed.

The dynamic CPU frequency may be handled in several ways, most of them requiring OS changes. Two possible ways are:

Priority regulates speed

Priority regulated by a performance monitor

Priority: This method is implemented in the OS. The OS selects an operating frequency for each task or signal priority. This method is suitable if the tasks have unequal priorities.

Monitor: This method relies on a monitor of some sort. E.g. the number of signals in the message queue is monitored, and as the number of messages in the queue increases, the CPU speed is increased. Another parameter by which the CPU load can be monitored and regulated is the CPU idle time, i.e. time spent in a low priority task.

This method is suitable if there is an equal priority among the various tasks. Other methods are of course possible to use as well, e.g. a combination of the two, where the speed is selected by the tasks themselves.

The result will depend heavily on the external stimuli, the dimensioning of the CPU system and the application. The result is, however, likely to be significant.

Basis for the Present Method

This method relies on the fact that the EMI measurement uses quasi-peak as the approval criteria, and that CPUs in a real-time system are dimensioned for peak performance and are therefore running idle much of the time.

The method aims at removing the unused unnecessary CPU capacity and will thus, if applied correctly, not affect the performance of the system.

CPU Dimensioning

CPUs are in real-time systems usually dimensioned for peak performance. The critical parameter for these systems is the maximum allowed response time in a worst case situation (+50% just in case). Administrative systems are dimensioned for sustained performance.

Many CPUs in real-time systems do "nothing": They wait, consume power and radiate. What does the CPUs really do:

Checks if there is something to do (OS-scheduler)

Handles timer ticks

Executes tasks

A test case revealed that the above three activities consumed 95%, 4% and 1%, respectively. It was possible on the test unit to increase the "execute figure" up to 25% by supplying an extreme external stimuli.

This does not mean that the CPU has been overdimensioned. The power is needed to perform critical tasks. These tasks may, however, occur very seldom, and the CPU therefore burns a lot of unneeded power and radiates unnecessarily.

Dynamic Timer Ticks with CPU Power-down

The timer tick handling of most OSs is such that the OS receives regular ticks. These ticks come at intervals such as every 5 or 10 msec. The OS counts these ticks and translates this to the ordered timer values.

To use the dynamic timer concept the OS must order tick interrupts periods according to the next time-out required. The ticks will then always be required by some task and all the unnecessary timer ticks have been removed. This is visualized in FIGS. 5 and 6.

Figure 5:
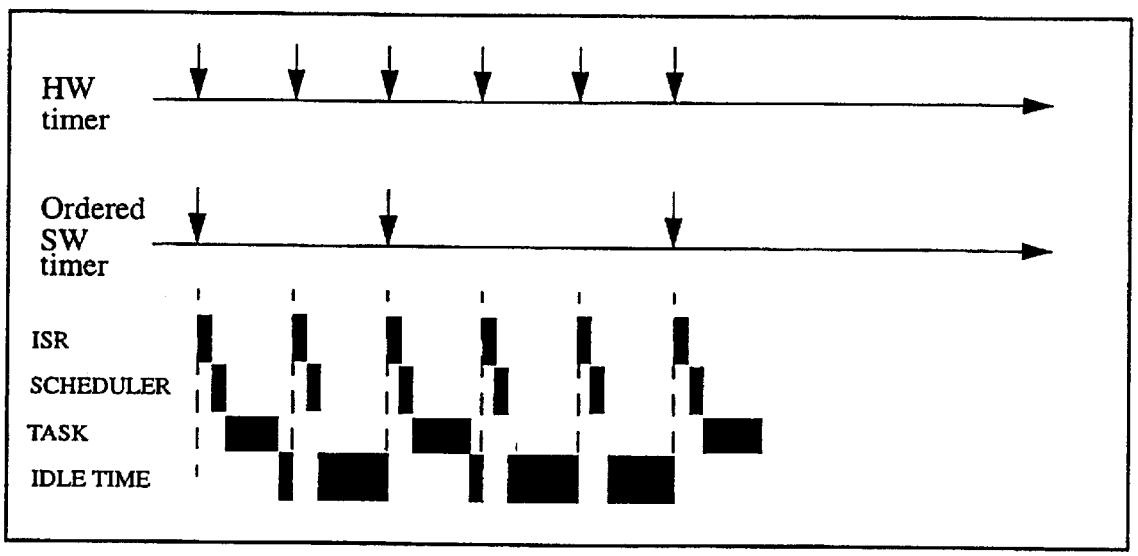
FIG. 5 is a composed diagram illustrating CPU usage with normal timer ticks.
Figure 6:
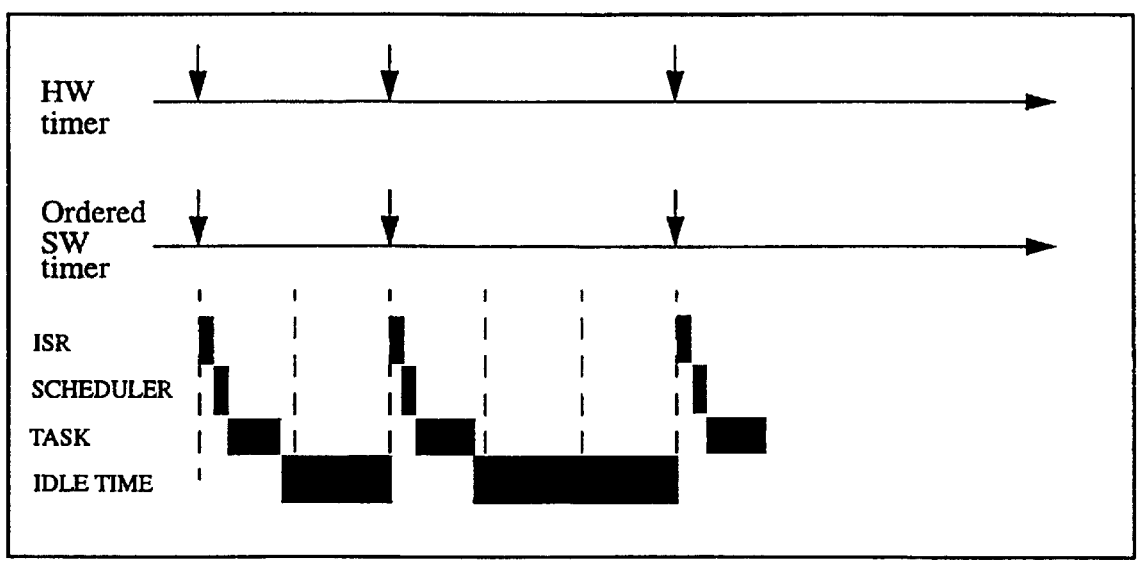
FIG. 6 is a composed diagram illustrating CPU usage with dynamic timer ticks.

FIGS. 5 and 6 show the CPU usage in the two cases. The two lines at the top show the timer events produced and ordered, respectively. The HW (hardware) timer is the interrupt produced by a HW circuit to signal a timer event. The SW (software) timer indicates the time-outs as required by the application.

The next four lines show the distribution of the CPU time between the involved activities. The Interrupt Service Routine (ISR) handles the timer interrupt and calls the OS scheduler, which checks if there are any tasks waiting for this time-out. If there is, the task is started, otherwise the CPU runs idle.

The CPU bus access is the inverse of the idle time if the CPU is powered down during the idle time. As can be seen from these Figures, the idle time has been increased and especially the CPU bus access frequency has been significantly decreased. Thus, by combining this type of timer handling with CPU power-down described previously, the result is that the CPU only executes whenever there is work to do. The CPU bus access frequency is thus reduced to a minimum.

FIG. 4 shows that if the CPU bus access frequency is reduced, then the quasi-peak measurement gives a lower value for the radiation caused by the CPU bus access, and thus the probability of compliance is increased.

Implementation

This method may require an OS change. This is easy with a proprietary OS, but can cause some problems with a commercial OS. It may require that the supplier changes the OS timer handling.

In order to get the most out of this technique, one should avoid high frequency polling, as this will then replace the timer ticks and revert the system back to the previous situation. The effect will be best for a completely interrupt-driven system without any SW polling.

Expected result

The result of this change may vary from application to application, as it will depend on which interrupt comes at the shortest regular interval. Typically a reduction in the range of 6 dB can be expected.

Another result will be a possible reduction in the power consumption.

Advantages

The main advantages with this invention is thus:
Reduced EMI problems
Reduced Power consumption
Improved accuracy of timer Broadening Dynamic timer ticks increase the accuracy of the CPU timers as the time-out period can be controlled extremely well. The accuracy is not in any way dependent on the timer-tick resolution only on the HW timer resolution.

| Abbreviations | |
|---|---|
| CISPR 22 | Standard for measuring radiated and conducted emission |
| CPU | Central Processing Unit microprocessor |
| EMC | Electromagnetic Compatibility |
| EMI | Electromagnetic Interference |
| OS | Operating System |
| ISR | Interrupt Service Routine |
| Q-peak | Quasi peak. A measurement method for emitted radiation |

What is claimed is:

1. Method for reducing electromagnetic emission in high-performance real-time systems for complying with EMC (ElectroMagnetic Compatibility) requirements thereof, comprising:

controlling access to a CPU (Central Processing Unit) bus to reduce bus-activity on said CPU bus and thereby reduce electromagnetic emission therefrom, and ordering a tick interrupt period of a hardware timer according to a time-out required by an application, thereby removing unnecessary timer ticks and corresponding task check operations.

2. Method as claimed in claim 1, wherein said controlling access to said CPU bus is made such that CPU access time is substantially an inverse of any CPU idle time.

3. Method as claimed in claims 1 or 2, wherein access to the CPU bus is controlled by letting said time-out be indicated by a software timer, which dynamically controls the hardware timer.

4. Method as claimed in claim 3, wherein said software timer orders said time-out at a time unit level of said hardware timer.

5. Method as claimed in claim 4, wherein said CPU bus access control is dependent upon said application, such that in case of an application requiring no timer tick at all, such timer tick or ticks will be deleted.

6. Method as claimed in claim 3, wherein said CPU bus access control is dependent upon said application, such that in case of an application requiring no timer tick at all, such timer tick or ticks will be deleted.

7. Method as claimed in claim 2, wherein said CPU bus access control is dependent upon said application, such that in case of an application requiring no timer tick at all, such timer tick or ticks will be deleted.

8. Method as claimed in claim 1, wherein said CPU bus access control is dependent upon said application, such that in case of an application requiring no timer tick at all, such timer tick or ticks will be deleted.

9. Method as claimed in claim 1, wherein said controlling access to said CPU bus includes powering down said CPU during CPU idle time.

* * * * *